United States Patent
Mazumder et al.

(10) Patent No.: US 6,410,105 B1
(45) Date of Patent: Jun. 25, 2002

(54) PRODUCTION OF OVERHANG, UNDERCUT, AND CAVITY STRUCTURES USING DIRECT METAL DEPOSTION

(76) Inventors: Jyoti Mazumder, 5074 Birkdale Rd., Ann Arbor, MI (US) 48103; Timothy Skszek, 5473 Countryside Dr., Saline, MI (US) 48176; Joseph K. Kelly, 44696 Helm St., Plymouth, MI (US) 48170; Joohyun Choi, 817 Cambridge Dr., Rolla, MO (US) 65401

(*) Notice: Subject to any disclaimer, the term of this patent is extended or adjusted under 35 U.S.C. 154(b) by 0 days.

(21) Appl. No.: 09/570,986

(22) Filed: May 15, 2000

Related U.S. Application Data

(63) Continuation-in-part of application No. 09/526,631, filed on Mar. 16, 2000, which is a continuation-in-part of application No. 09/107,912, filed on Jun. 30, 1998, now Pat. No. 6,122,564.
(60) Provisional application No. 60/142,125, filed on Jul. 2, 1999.

(51) Int. Cl.$^7$ ................................................. B05D 3/00
(52) U.S. Cl. .................... 427/554; 427/555; 427/556; 427/597; 427/596; 219/121.65; 219/121.66
(58) Field of Search ............................... 427/135, 271, 427/554, 555, 556, 597, 264, 287, 596; 219/121.65, 121.66

(56) References Cited

U.S. PATENT DOCUMENTS

| | | | |
|---|---|---|---|
| 4,044,774 A | 8/1977 | Corbin et al. | 128/404 |
| 4,323,756 A | 4/1982 | Brown et al. | 219/121.66 |
| 4,411,258 A | 10/1983 | Pujals, Jr. | 128/60 |
| 4,626,999 A | 12/1986 | Bannister | 700/166 |
| 4,633,889 A | 1/1987 | Talalla et al. | 128/784 |
| 4,724,299 A | 2/1988 | Hammeke | 219/121.6 |
| 4,803,986 A | 2/1989 | Dufresne et al. | 128/385 |

OTHER PUBLICATIONS

W.M. Steen, "Laser Material Processing," 1998 Springer, Chap. 7 & 8 (pp. 272–320).
E. Renier et al., CCD Technology Applied To Industrial Welding Applications, IEEE database, and pp. 1335–1338, May 1996.
F. Meriaudeau et al., Acquistion and Image Processing System Able To Optimize Laser Cladding Process, IEEE database, pp. 1628–1631, 1996.
Jyoti Mazumder, Advanced Lase Processing of Metals, IEEE database, pp. 23–25.

(List continued on next page.)

Primary Examiner—Bret Chen
Assistant Examiner—Eric B Fuller
(74) Attorney, Agent, or Firm—Gifford, Krass, Groh, Sprinkle, Anderson & Citkowski, PC

(57) ABSTRACT

Overhang and undercut features, as well as cavities, channels, pipes and three-dimensional voids and other structures are fabricated using a laser-aided direct-metal deposition (DMD) processes. In the preferred embodiment, this is accomplished through the selective deposition of a lower melting point sacrificial material. Following the integrated deposition of both sacrificial and non-sacrificial materials using DMD, the part is soaked in a furnace at a temperature sufficiently high to melt out the sacrificial material. As preferred options, the heating is performed in an inert gas environment to minimize oxidation, with a gas spray also being used to blow out remaining deposits. Using this technique, articles having integral sensors and cooling channels may be used as part of an automated system for controlling the temperature, stress and strain during the shaping or forming of a product using the resultant smart die or mold. Such a system would preferably include means of controlling the inlet flow of coolant and means for controlling or terminating the forming or injection process. The control is preferably mediated through a computer which analyzes and evaluates the inputs from the sensors and transmits the resulting information to a flow controller and to a process controller or logic gate, so that appropriate actions are carried out on a continuous basis.

21 Claims, 5 Drawing Sheets

U.S. PATENT DOCUMENTS

| | | | |
|---|---|---|---|
| 4,915,757 A | 4/1990 | Rando | 156/64 |
| 5,031,618 A | 7/1991 | Mullett | 128/421 |
| 5,041,974 A | 8/1991 | Walker et al. | 364/413.27 |
| 5,196,015 A | 3/1993 | Neubardt | 606/61 |
| 5,303,141 A | 4/1994 | Batchelder et al. | 700/29 |
| 5,316,707 A | 5/1994 | Stanciu et al. | 264/40.1 |
| 5,342,409 A | 8/1994 | Mullett | 607/46 |
| 5,358,513 A | 10/1994 | Powell, III et al. | 607/48 |
| 5,423,877 A | 6/1995 | Mackey | 607/117 |
| 5,456,870 A | 10/1995 | Bulgrin | 264/40.6 |
| 5,474,558 A | 12/1995 | Neubardt | 606/79 |
| 5,501,703 A | 3/1996 | Holscheimer et al. | 407/46 |
| 5,591,385 A | 1/1997 | Arai et al. | 264/40.6 |
| 5,612,887 A | 3/1997 | Laube et al. | 700/119 |
| 5,642,287 A | 6/1997 | Sotiropoulos et al. | 700/166 |
| 5,643,330 A | 7/1997 | Holscheimer et al. | 607/46 |
| 5,659,479 A | 8/1997 | Duley et al. | 700/166 |
| 5,775,402 A * | 7/1998 | Sachs et al. | 164/4.1 |
| 5,837,960 A | 11/1998 | Lewis et al. | 219/121.63 |
| 5,951,163 A | 9/1999 | Jen et al. | 374/119 |
| 5,993,554 A * | 11/1999 | Keicher et al. | 118/641 |
| 6,143,378 A * | 11/2000 | Harwell et al. | 427/597 |
| 6,224,816 B1 * | 5/2001 | Hull et al. | 264/401 |

\* cited by examiner

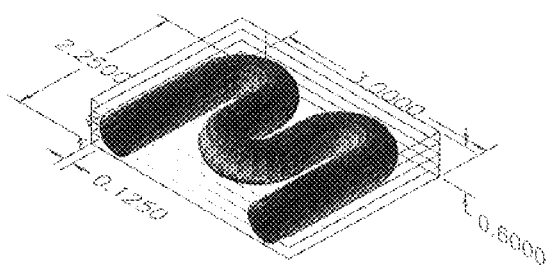 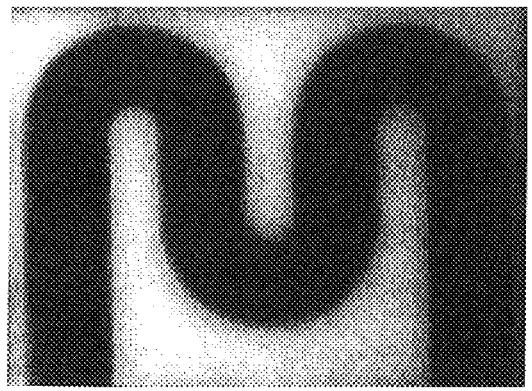
CAD IMAGE      RADIOGRAPH IMAGE
*Figure - 3A*      *Figure - 3B*

CAD IMAGE

RADIOGRAPH IMAGE

PRODUCTION OF OVERHANG, UNDERCUT, AND CAVITY STRUCTURES USING DIRECT METAL DEPOSTION

REFERENCE TO RELATED APPLICATIONS

This application claims priority from U.S. provisional patent application Serial No. 60/142,125, filed Jul. 2, 1999, and is a continuation-in-part of U.S. patent application Ser. No. 09/107,912, filed Jun. 30, 1998, now U.S. Pat. No. 6,122,564, and co-pending U.S. patent application Ser. No. 09/526,631, filed Mar. 16, 2000, the entire contents of both of which are incorporated herein by reference.

FIELD OF THE INVENTION

This invention relates generally to laser-based additive manufacturing and, in particular, to direct-metal deposition, or DMD. More specifically, this invention relates to the production of overhang, undercut, and cavity structures using DMD processes.

BACKGROUND OF THE INVENTION

U.S. patent application Ser. No. 09/526,631 relates to the production of smart dies and molds using a direct metal deposition or DMD process. This parent application describes how DMD may advantageously be employed to integrate sensors into dies, molds, and other articles for monitoring temperature, distortion and/or stress. This previous patent application also illustrates the ability of the DMD method to create complex and multi-material three-dimensional articles with built-in cooling channels and pipes.

The ability to build overhang and undercut features and, in particular, three-dimensional cooling channels in injection die-casting molds, is an important aspect of rapid prototyping. Moreover the ability and flexibility to deposit material in desired locations with DMD to build complicated 3D parts, as well as in-situ 3D channels, adds numerous advantages to the process. With the help of appropriate software to analyze heat transfer phenomena, nearly ideal articles may be manufactured using DMD. Such parts offer highly effective heat transfer while avoiding temperature gradients through uniform cooling made possible in part by channels, pipes, or other three-dimensional structures.

SUMMARY OF THE INVENTION

This invention provides further details with respect to the fabrication of overhang, undercut, and cavity structures using laser-aided direct-metal deposition (DMD) processes. Important characteristics of the DMD method include the ability to control the height of the deposited layer from the melt pool for each pass of the laser beam through a feedback controller coupled with optoelectric sensors. The thickness of the deposited layers can be as small as a couple of hundred microns, and the final surface roughness is less than that.

According to the invention, cooling channels and other features, which are part of the geometry or structure of the article, including holes, cavities, discontinuities, steps, corners, and so forth, are created during the same DMD fabrication process. In the preferred embodiment, this is accomplished through the selective deposition of a lower melting point sacrificial material. In one disclosed example, aluminum is used as a sacrificial material in conjunction with the fabrication of a steel body. Other materials and material combinations, including copper-tin alloys, are also disclosed.

Following the integrated deposition of both materials using DMD, the part is soaked in a furnace at a temperature sufficiently high to melt out the sacrificial material. As preferred options, the heating is performed in an inert gas environment to minimize oxidation, with a gas spray also being used to blow out remaining deposits.

Using this technique, articles having integral sensors and cooling channels may be used as part of an automated system for controlling the temperature, stress and strain during the shaping or forming of a product using the resultant smart die or mold. Such a system would preferably include means of controlling the inlet flow of coolant and means for controlling or terminating the forming or injection process. The control is preferably mediated through a computer which analyzes and evaluates the inputs from the sensors and transmits the resulting information to a flow controller and to a process controller or logic gate, so that appropriate actions are carried out on a continuous basis.

BRIEF DESCRIPTION OF THE DRAWINGS

FIG. 3A is a transparent isometric view of a sample part fabricated using direct metal deposition including a 0.5-inch cooling channel;

FIG. 3B is a top-view radiographic image of the sample of FIG. 3A showing the consistent diameter of the cooling channel;

DETAILED DESCRIPTION OF THE INVENTION

The present invention is directed to the fabrication of overhangs, undercuts, cavities, and three-dimensional structures integrated into the body of molds, dies and other articles manufactured using a direct metal deposition (DMD) process. More particularly, such structures are integrated during the fabrication process, which is done layer by layer using a laser-aided DMD system preferably equipped with feedback monitoring and control of the dimensions and overall geometry of the fabricated article.

The geometry of the article is provided by a computer-aided design (CAD) system. The deposition tool path is generated by a computer-aided manufacturing (CAM) system (CAM) for CNC machining with post-processing software for deposition, instead of software for removal as in conventional CNC machining. CAM software interfaces with the feedback controller. Details of the DMD process can be found in U.S. patent application Ser. No. 09/107,912, which is fully incorporated herein by reference.

Figure 1:
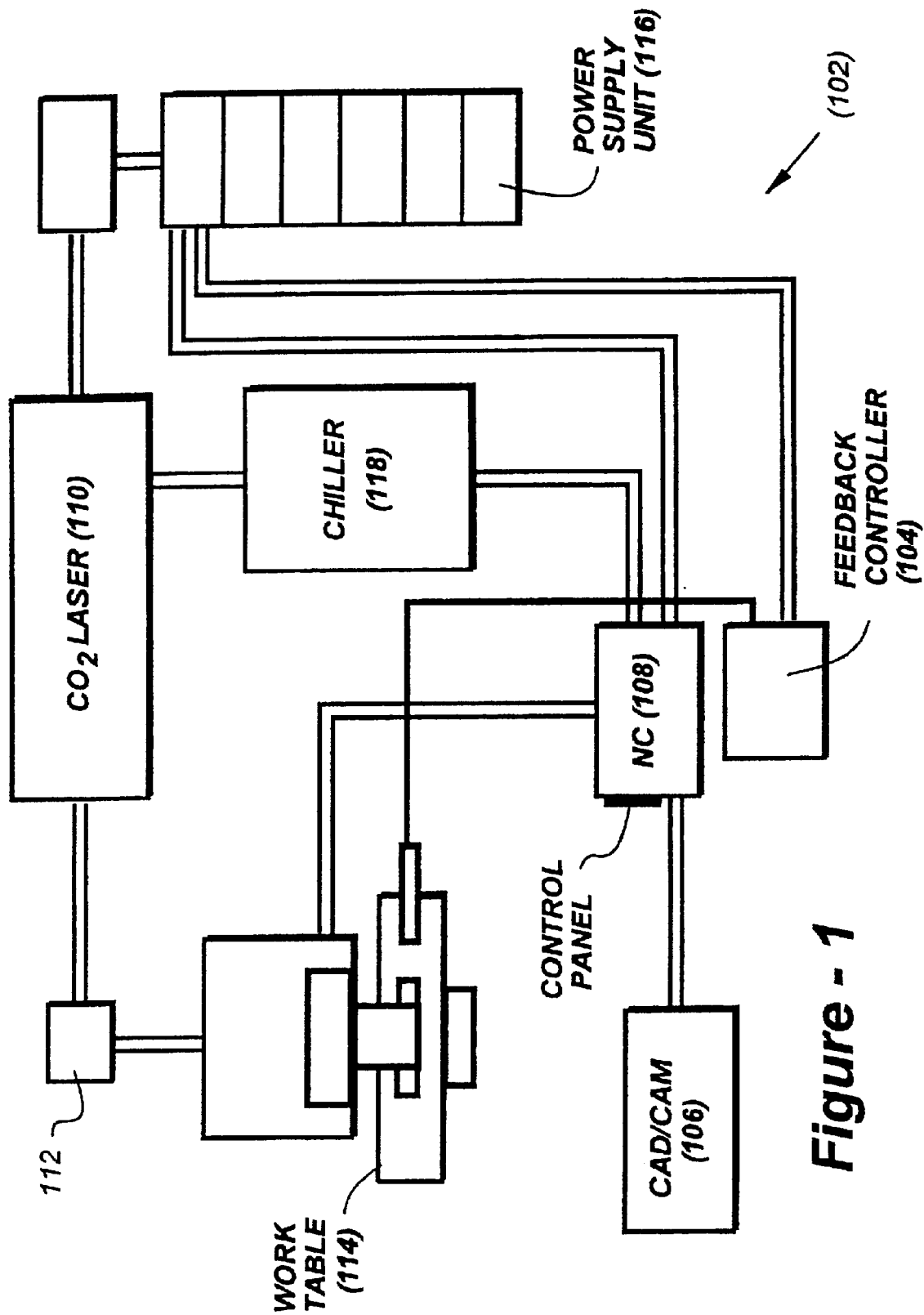
FIG. 1 shows a schematic of a laser-aided direct metal deposition system for fabricating product-shaping devices.
Figure 2:
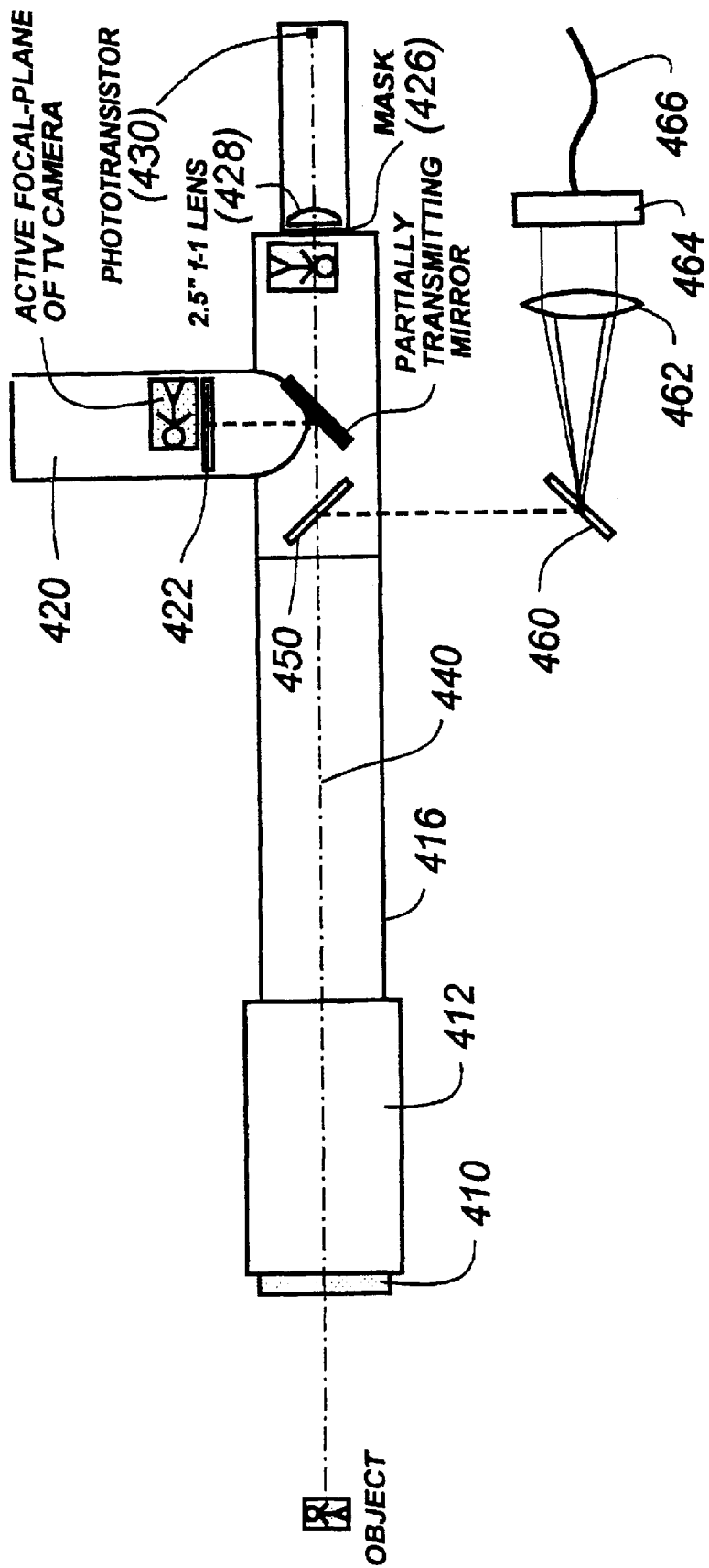
FIG. 2 shows a schematic of an optical monitoring system for a laser-aided direct metal deposition system and the important features of the feedback controller, to be used in fabricating product-shaping devices.

FIGS. 1 and 2 illustrate the laser-aided direct metal deposition (DMD) system which is the subject of commonly-owned U.S. patent application Ser. No. 09/107.912. FIG. 1 is a schematic of the DMD system 102 which includes a feedback controller 104 and a CAD/CAM system 106 for automated production of parts or products. The factors that affect the dimensions of material deposition include laser power, beam diameter, temporal and spatial distribution of the beam, interaction time, and powder flow rate. Adequate monitoring and control of laser power, in particular, has a critical effect on the ability to fabricate completed parts and products with complex geometries and within control tolerances. Accordingly, the feedback controller 104 of the DMD system typically cooperates directly with the numerical controller (NC) 108, which, itself, controls all functions of the DMD system, including laser power.

As shown in FIG. 1, the DMD system comprises a laser source 110 having an appropriate beam focusing means 112. The laser source is mounted above the substrate or workpiece in order to focus the laser beam on the working area, and the workpiece substrate is carried on a worktable 114. Either through the worktable 114 or through some other arrangement, the relative motion between the workpiece substrate and the laser beam and laser spray nozzle is controlled. A power supply unit 116 and a chiller 118 to cool the laser are part of the DMD system. The laser has sufficient density to create a melt pool with the desired composition of substrate or previously deposited layer and cladding powder. The cladding powder, typically metallic, is sprayed on the substrate preferably through a laser spray nozzle with a concentric opening for the laser beam, as described in U.S. Pat. No. 4,724,299, so that the powder exits the nozzle co-axially with the beam.

The numerical controller 108 controls all operating components of the DMD system of FIG. 1, including the operating conditions of the laser, receiving direction from the CAD/CAM computer 106 for building the part or product. The NC controller also receives feedback control signals from the feedback controller 104 to adjust laser power output, and further controls the relative position of the worktable and laser spray nozzle. The CAD/CAM system is equipped with software which enables it to generate a path across the substrate for material deposition. This feature makes it possible to execute rapid prototyping or to form a solid three-dimensional product directly from CAD specifications.

FIG. 2 shows schematically an optical monitoring system, which also illustrates the principles of the feedback control system of the DMD system. The optical control system is used to monitor optically and electronically a physical characteristic of the melt pool or of the deposited material layer, such as material composition, or physical dimension. The ability to control the height of the layer of material deposit, and to correct imperfections, makes the DMD method the preferred method for fabricating smart dies and molds, as well as any products with built-in integral sensors, and products with pipes, channels and other complex internal or external geometric features, also having non-uniform material composition.

A narrow-band pass filter 410 is placed in front of a camera lens 412. The image is passed through barrel extenders 416, after which a portion of the image (approximately 10 percent) is reflected to an active focal plane of a TV camera 420. The reflected image preferably passes through a neutral density filter 422 placed between the reflector and the active focal plane of the TV camera. The transmissive portion of the optical image passes through the reflector, and the magnified image is masked at a focal plane to provide partial resolution. The image exiting the mask 426 passes through a lens 428 and then to a light-sensitive device such as phototransistor 430. The optical axis 440 angle and the magnification of this optical train are arranged such that small changes in the height of the laser clad can be distinguished by the phototransistor 430.

According to this invention, cooling channels and other features, which are part of the geometry or structure of the article, including holes, cavities, discontinuities, steps, corners, and so forth, are created through the selective deposition of a lower melting point sacrificial material. Preferred materials include zinc, tin, aluminum, and alloys thereof. In principle, as long as the difference in melting temperature between the sacrificial and non-sacrificial materials is sufficiently high, a particular material combination may be made to work, depending upon factors such as dT/da, the size of the part, and so forth. In many cases a melting temperature difference on the order of 100 C. or greater is workable. CuSn was found to be particularly beneficial as a sacrificial material for use with tool steels, including D2, S7, H13 and P20, since the melting temperature of certain CuSn alloys is consistent with that used for heat treating, but below that at which grain growth occurs. CuSn also maintains a consistent height during DMD fabrication processes.

In terms of the technique used, powder is deposited at desired locations as per the instructions received from the sliced CAD file to the controller until the final part was fabricated layer-by-layer with the integrated DMD system. Two samples were fabricated to build up three-dimensional cooling channels. Sample 1 (S1) is shown from an isometric perspective in FIG. 3A, and in the form of a radiograph image in FIG. 3B. This particular sample is constructed from a block of tool steel measuring 2.25×3×0.6 inches, and features a 0.5 inch diameter serpentine cooling channel fabricated through the sacrificial melt-away of a selective deposition, in this case aluminum.

Figure 4A:
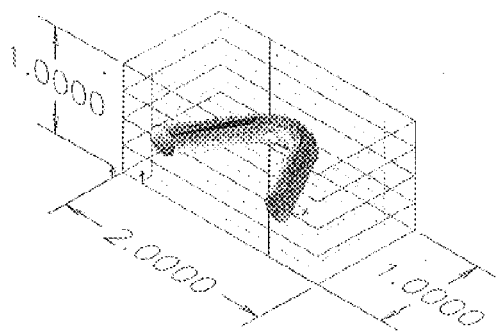
FIG. 4A is a transparent isometric view of a sample part fabricated using direct metal deposition including a 0.125-inch cooling channel.
Figure 4B:
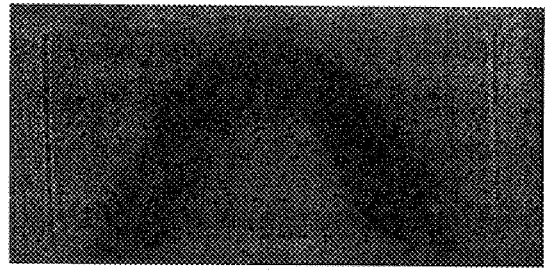
FIG. 4B is a top-view radiographic image of the sample of FIG. 4A showing the consistent diameter of the cooling channel.

Sample 2 (S2), is shown in isometric view in FIG. 4A, with a corresponding radiograph in FIG. 4B. S2 is fabricated from a smaller block of tool steel, measuring 2×1×1 inch, and includes a copper chiller block and a V-shaped channel measuring 0.125 inches in diameter, also fabricated through the selective deposition and melt-away of an aluminum path.

The processing parameters used in the fabrication of the parts are tabulated in Tables 1, 2, and 3, which are reproduced below:

TABLE 1

TOOL PATH: SPIRAL
Processing Parameters for H13 Tool Steel

| Power (kW) | Transverse Speed (mm/s) | Mass flow rate (gm/min) | Sensor Status | Deposition Thickness (mm) |
|---|---|---|---|---|
| 1.25 | 12.7 | 6.4 | ON | 0.508 |

TABLE 2

TOOL PATH: SPIRAL
Processing Parameters for Copper

| Power (kW) | Transverse Speed (mm/s) | Mass flow rate (gm/min) | Sensor Status | Deposition Thickness (mm) |
|---|---|---|---|---|
| 1.3 | 10.58 | 3.0 | ON | 0.254 |

TABLE 3

TOOL PATH: ZIG-ZAG (X OR Y DIRECTION)
Processing Parameters for Aluminum

| Power (kW) | Transverse Speed (mm/s) | Mass flow rate (gm/min) | Sensor Status | Deposition Thickness (mm) |
|---|---|---|---|---|
| 500 | 14.82 | 1.4 | ON | 0.254 |

The parameters listed in the tables above were used in deposition in all the layers until completion of the sample. Only in deposition of the first layer of Al was a power of 1250 W used to provide a good bonding between the two interfaces, after which the optical sensor was switched to the OFF mode.

The Al parameters were optimized to curtail warping or delamination of the Al deposited layer from the surface. An important factor that eliminated warping was the nature of the tool pass or the deposition. In particular, it was found that deposition of Al in a zigzag fashion drastically reduced the problem in comparison to a spiral tool path. It was also observed in fabricating Sample 2 (S2) that the warping problem was drastically reduced due to the increased miscibility of Cu in Al as compared to steel.

Oxidation of the aluminum was also feared during the DMD process from the ambient air, but on conducting the experiments in both a shielded chamber (in Ar inert gas) and in the ambient atmosphere, it was determined that the oxidation of the Al was not problematic even when the process was carried out in atmosphere, thus adding a further advantage in comparison to the use of zinc as a sacrificial material.

After the parts were fabricated they were soaked in the furnace at 1400° F. for an hour in an inert gas (Ar) environment. After an hour, most of the aluminum flowed out freely with slight tapping of the workpiece. The remainder of the Al was blown out with the help of Ar gas with adequate protection to guard against splattering of the molten metal. To non-destructively determine the quality and the profile of the channels fabricated in the samples, radiographed images of the samples were taken. The radiographed images are shown below in FIGS. 3B and 4B for samples S1 and S2, respectively, and these radiographs compared favorably to the initial CAD files used to fabricate the parts. As should be evident from the radiographed images, the channels fabricated in the samples by this technique are consistent in diameter throughout. Thus, dimensional accuracy and complicated curved channels can be fabricated by using Al as the sacrificial material using the DMD process.

Figure 5:
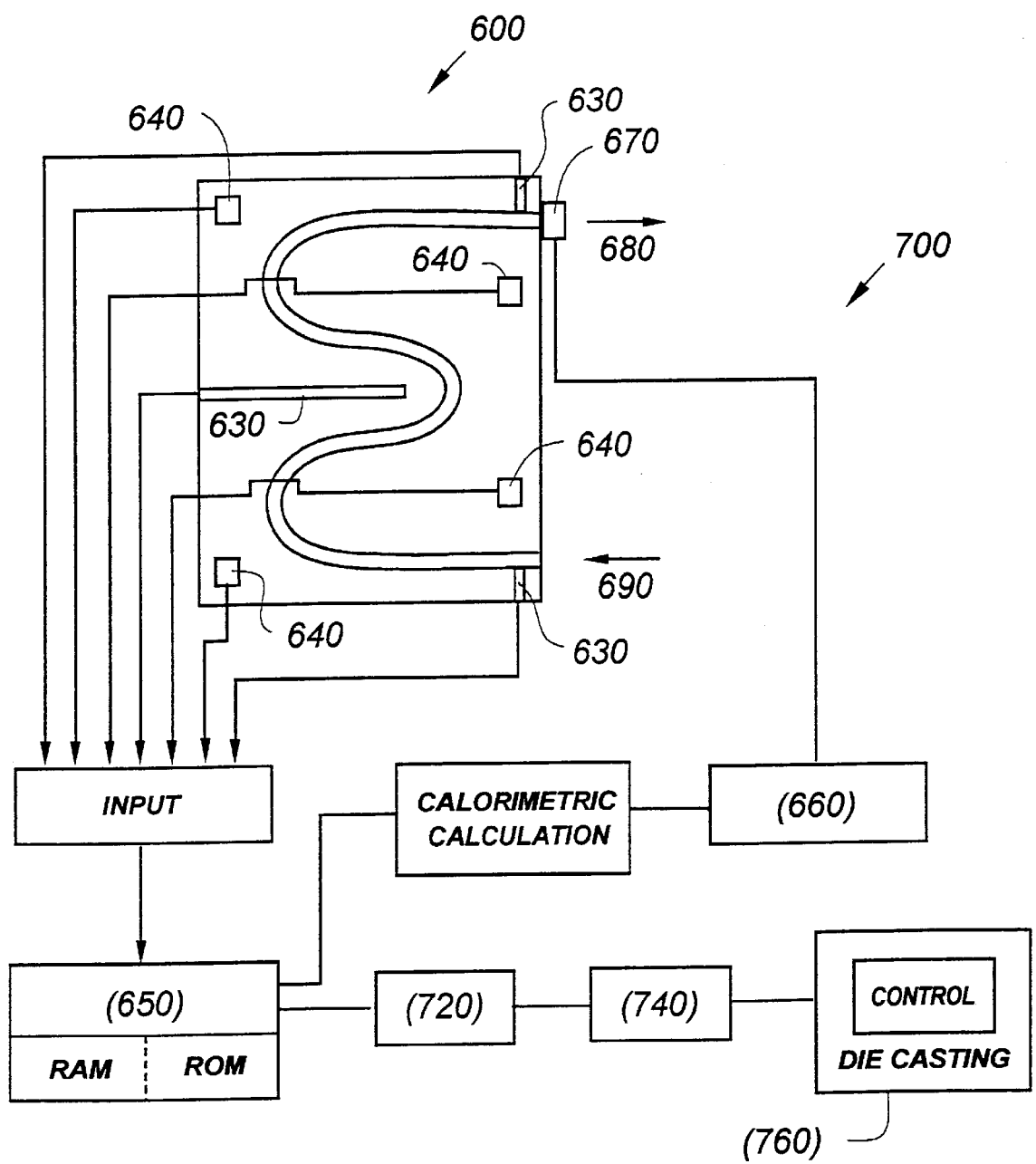
FIG. 5 is a diagram which illustrates a smart die and system for real-time monitoring and controlling the fabrication process and the characteristics of the fabricated article.

FIG. 5 shows a schematic diagram of a smart product-shaping device 600, which could be a die or mold, and the associated system 700 for monitoring and controlling temperature, stress and strain history, and water (or other coolant) flow. The die includes integral cooling channels 620, thermocouples 630, and other semiconductor temperature sensors 640, such as diodes, transistors and thermistors, for the purpose of measuring temperature at different locations within the mold or die. The thermocouples and the solid state electronic sensors provide reliable and consistent temperature measurements, which then serve as input for the computer 650.

In addition to temperature sensors, strain gages and piezoelectric devices are fabricated in critical sites of the product-shaping device to monitor the strain and stress development and accumulation, including stress concentrations, which are caused by non-uniform temperature fluctuations or other constraints and conditions that lead to the formation of residual stresses. These devices are not shown in FIG. 5, but their measurements are also fed to computer 650. The temperature, stress and strain histories received by the computer are compared with stored experimental or theoretical histories, which serve as the knowledge base and the standard model history for the processing and production of new products using the product-shaping apparatus 600. The computer performs a calorimetric calculation and is interfaced with a coolant flow controller 660, which operates an electronic flow meter 670. The flow meter 670 adjusts the amount of coolant through the inlet 680 to the cooling channels.

In addition to the calorimetric calculation that controls the coolant flow, the computer performs a stress and strain history comparison and, based on the results, a GO/NO GO signal is sent to logic gate 720. If the signal is "NO GO," a warning bell 740 is activated to alert the human operator, and the controller 760 stops the injection molding or die casting process. If the signal from the computer is "GO," no further action is taken, and the injection process or die casting proceeds as scheduled.

The method and system of fabricating dies and molds with integral sensors by the present invention can be also applied to other articles in which temperature or other type sensors are useful during actual operation or service. The present invention offers the advantage of creating "smart" products or devices, not limited to tools and industry components, but also including consumer goods, in one integrated operation which is fast, safe and accurate, and it serves the demands of rapid and just-in-time manufacturing. The materials that can be used include, but are not limited to tool steel, aluminum, copper, bronze, tin, nickel and ferrous alloys.

Already existing "smart" products or tools or metallic components or parts thereof, can also be improved, and may be fabricated more efficiently with reduction of time and cost and increased safety using the system and method of the invention, so that the required sensors are embedded in one integral fabrication operation through laser-aided direct metal deposition. New "smart" products or parts may be easily manufactured and brought to market by embedding the appropriate sensors into the body of the product or part during the fabrication process.

We claim:

1. A method of manufacturing an article having an internal void, comprising the steps of:

fabricating the article without the void on a layer-by-layer basis using a laser-aided direct metal deposition process to fabricate each layer wherein:

the body of the article is fabricated by selectively depositing, by use of the laser-aided direct metal deposition process, form a first material having a first melting point, and the volume which will become the void is fabricated by selectively depositing, by use of the laser-aided direct metal deposition process, a second material having a second melting point which is lower than the first melting point, thereby producing a completed article; and heating the completed article at a temperature above the second melting point so that the second material flows out of the article to create the void.

2. The method of claim 1, wherein the void is an overhang, an undercut, a cavity or a channel.

3. The method of claim 1, wherein the article is a die or a mold.

4. The method of claim 1, wherein the void is a cooling channel.

5. The method of claim 1, wherein the first material is steel.

6. The method of claim 1, wherein the second material is aluminum.

7. The method of claim 1, wherein the second material is a copper-tin alloy.

8. The method of claim 1, wherein the step of heating the completed article occurs in an inert gas.

9. The method of claim 1, further including the step of blowing any of the second material which remains in the body of the article after heating using a flow of inert gas.

10. The method of claim 1, further including the step of embedding one or more sensors into the body relative to the void, each sensor outputting an electrical signal indicative of a sensed parameter.

11. The method of claim 1, further including the steps of:

receiving a description of the article to be manufactured including dimensions associated with the body and volume to become the void; and visually monitoring the selective deposition of the first and second materials to ensure that their dimensions agree with the description.

12. A method of manufacturing an article having an internal void, comprising the steps of:

receiving a description of the article to be manufactured, the description including dimensions associated with the article and the internal void;

fabricating the article without the void on a layer-by-layer basis using a laser-aided direct metal deposition process to fabricate each layer, wherein:

the body of the article is fabricated by selectively depositing, by use of the laser-aided direct metal deposition process, a first material having a first melting point, and the volume which will become the void is fabricated by selectively depositing, by use of the laser-aided direct metal deposition process, a second material having a second melting point which is lower than the first melting point, thereby producing a completed article;

visually monitoring the selective deposition of the first and second materials to ensure that their dimensions agree with the description; and heating the completed article at a temperature above the second melting point so that the second material flows out of the article to create the void.

13. The method of claim 12, wherein the void is an overhang, an undercut, a cavity or a channel.

14. The method of claim 12, wherein the article is a die or a mold.

15. The method of claim 12, wherein the void is a cooling channel.

16. The method of claim 12, wherein the first material is steel.

17. The method of claim 12, wherein the second material is aluminum.

18. The method of claim 12, wherein the second material is a copper-tin alloy.

19. The method of claim 12, wherein the step of heating the completed article occurs in an inert gas.

20. The method of claim 12, further including the step of blowing any of the second material which remains in the body of the article after heating using a flow of inert gas.

21. The method of claim 12, further including the step of embedding one or more sensors into the body relative to the void, each sensor outputting an electrical signal indicative of a sensed parameter.

* * * * *